(12) United States Patent
Li et al.

(10) Patent No.: US 11,161,271 B2
(45) Date of Patent: Nov. 2, 2021

(54) METHOD FOR PREPARING ROOM TEMPERATURE CURED MULTIFUNCTIONAL WOOD MODIFIER AND METHOD FOR WOOD MODIFICATION

(71) Applicant: SHANDONG AGRICULTURAL UNIVERSITY, Shandong (CN)

(72) Inventors: Yongfeng Li, Shandong (CN); Xiaoying Dong, Shandong (CN)

(73) Assignee: SHANDONG AGRICULTURAL UNIVERSITY, Shandong (CN)

( * ) Notice: Subject to any disclaimer, the term of this patent is extended or adjusted under 35 U.S.C. 154(b) by 0 days.

(21) Appl. No.: 16/799,272

(22) Filed: Feb. 24, 2020

(65) Prior Publication Data

US 2020/0269461 A1    Aug. 27, 2020

(30) Foreign Application Priority Data

Feb. 25, 2019   (CN) .......................... 201910137756.3

(51) Int. Cl.
| | | |
|---|---|---|
| *B27K 3/52* | (2006.01) | |
| *B27K 3/15* | (2006.01) | |
| *B27K 3/00* | (2006.01) | |
| *B27K 3/08* | (2006.01) | |

(52) U.S. Cl.
CPC ................ *B27K 3/52* (2013.01); *B27K 3/007* (2013.01); *B27K 3/08* (2013.01); *B27K 3/15* (2013.01); *B27K 2240/70* (2013.01)

(58) Field of Classification Search
CPC . B27K 3/52; B27K 3/007; B27K 3/08; B27K 3/15; B27K 2240/70
See application file for complete search history.

(56) References Cited

U.S. PATENT DOCUMENTS 7,056,846 B2 *   6/2006   Clark ................. C08G 18/2885
                                                                 106/287.27

FOREIGN PATENT DOCUMENTS

| CN | 201010590203.2 A | 12/2010 |
|---|---|---|
| CN | 201210383399.7 A | 10/2012 |
| CN | 20120466649.3 A | 11/2012 |

* cited by examiner

*Primary Examiner* — Michael P Wieczorek
(74) *Attorney, Agent, or Firm* — Bacon & Thomas, PLLC

(57) ABSTRACT

The present invention relates to a method for preparing a wood modifier and a method for wood modification, and in particular, to a method for preparing a room temperature cured multifunctional wood modifier and a method for wood modification to solve the problems of high construction temperature, high toxicity, poor leaching-resistance and single function of existing wood modifiers. The method includes: step 1: weighing a hydrophobic polymer resin, an additive, a curing agent and a solvent, mixing and then stirring at room temperature to obtain a functional reagent A; step 2: weighing nanoparticles, a surface modifier and toluene, mixing and then stirring, cleaning with acetone, centrifuging, and drying to obtain a functional reagent B; step 3: adding a functional reagent C into the functional reagent A, evenly stirring, adding the functional reagent B, and performing ultrasonic processing to obtain the multifunctional wood modifier.

17 Claims, 4 Drawing Sheets

METHOD FOR PREPARING ROOM TEMPERATURE CURED MULTIFUNCTIONAL WOOD MODIFIER AND METHOD FOR WOOD MODIFICATION

TECHNICAL FIELD

The present invention relates to a method for preparing a wood modifier and a method for wood modification.

BACKGROUND

Because of its unique composition and cellular porous structure, wood can easily absorb water and thus generate swelling, deformation, cracking and warping, mold decomposition and decay. Natural wood can be modified to prolong its service life and improve its waterproof performance. Common wood modification methods include: filling modified wood with a polymer, treating wood with a water-borne small molecular functional agent, treating a wood cell cavity or cell wall with a siloxane precursor, treating wood with a paraffin substance, etc. However, these methods have problems of releasing toxic gas, easy leaching of the functional agent, no flame retardance, no corrosion prevention and no weather resistance, etc.

In recent years, a new disruptive innovation technology-lotus leaf-inspired superhydrophobic self-cleaning nanotechnology has been widely recognized and deeply studied, which can make wood fundamentally waterproof; and has great application prospect. However, it cannot make wood have water resistance, oil pollution prevention, sterilization and mildew prevention, etc., and there are still other problems. For example, the direct construction of modified nanoparticles ($TiO_2$, $SiO_2$, $TiO_2$, $Al_2O_3$, ZnO, etc.) on the surface of wood has complicated process and harsh preparation conditions. Even if the modified nanoparticles are applied to wood in combination with a polymer, there is still a bottleneck of uneven distribution of nanoparticles in a polymer matrix.

The invention patent No. 201010590203.2 discloses a coating that can be cured at room temperature, while a maximum hydrophobic angle is only 120°, so that the super-hydrophobic effect cannot be achieved. Nano silica sol described in the invention patent No. 201210383399.7 has not been subjected to surface modification treatment, resulting in high surface energy and poor interface compatibility with fluoropolymer with low surface energy, and resulting in poor hydrophobic effect and no functions such as flame retardance and sterilization. The preparation of a superhydrophobic coating described in the invention patent No. 201210466649.3 involve three steps, where a first coating contains high-content modified particles, and the cost is high but a superhydrophobic coating cannot be constructed independently. After the first coating is cured, a nanometer material is applied to the surface of the coating separately. The steps are complicated, and the method cannot implement functions of oleophobicity, sterilization and the like. The fluorine-containing silicon polymer micro-nano emulsion described in the invention patent No. 201510472473.6 has no film-forming material, the durability of the coating film is thus poor, and there are no functions of sterilization, mildew prevention and the like. In addition, hydrophobic substances containing high fluorine components (the number of fluorine atoms in a single molecule are more than 8) also pollute the environment and are forbidden to be used by European and American countries. Although the invention patent No. 201610114880.4 provides a multifunctional wood modifier, the solvent is water-based, which easily causes wood swelling and deformation due to water, and film-forming drying requires high temperature, which wastes energy.

The modifiers of the foregoing methods have high construction temperature, high toxicity, special smell, poor leaching-resistance property, complicated operation process and high cost; or poor in-situ dispersibility of nanoparticles leads to poor superhydrophobic effect; or only the single waterproof performance of wood can be improved, while multiple reagents often affect the mutual effectiveness when compounded, and steps and costs of wood treatment are increased. As a result, there is no wood modification reagent that is simple to operate, environmentally friendly, does not cause negative performance defects of wood, and has multiple functions (water resistance, oil resistance, sterilization, mildew prevention, weather resistance, etc.).

SUMMARY

The present invention provides a method for preparing a room temperature cured multifunctional wood modifier and a method for wood modification to solve the problems of high construction temperature, high toxicity, poor leaching-resistance and single function of an existing wood modifier.

The method for preparing a room temperature cured multifunctional wood modifier according to the present invention includes the following steps:

step 1: weighing 1%-50% of hydrophobic polymer resin, 0.1%-1% of additive, 0.1%-10% of curing agent and the balance solvent according to weight percent respectively, mixing and then stirring at room temperature for at least 2 h to obtain a functional reagent A;

step 2: weighing 0.1%-5% of nanoparticles, 0.1%-2% of surface modifier and the balance toluene according to weight percent respectively, mixing and then stirring for 72-76 h, cleaning with acetone, centrifuging at 8000-9000 rpm for 3-5 times, and drying at 78-82° C. for 12-14 h to obtain a functional reagent B;

step 3: adding a functional reagent C into the functional reagent A, evenly stirring, adding the functional reagent B, and performing ultrasonic processing for at least 30 min to obtain the multifunctional wood modifier, where the weight of the functional reagent B is 0.1%-1% that of the functional reagent A, and the weight of the functional reagent C is 0.2%-2% that of the functional reagent A.

Further, the hydrophobic polymer resin in step 1 is fluorocarbon resin with less than 8 F atoms.

Further, the additive in step 1 is dibutyltin dilaurate, which has the effect of speeding up the resin drying.

Further, the curing agent in step 1 is aliphatic diisocyanate.

Further, the solvent in step 1 is D40 (a petroleum ether solvent).

Further, in step 2, the nanoparticles are one or a mixture of free combination of $SiO_2$, Ag, Cu, CuO, $TiO_2$ and ZnO at any ratio. The nanoparticles have a particle diameter of 10-500 mm.

Further, the surface modifier in step 2 is polydimethylsiloxane.

Further, the functional reagent C in step 3 is iodopropynyl butylcarbamate (IPBC).

Further, the ultrasonic power in step 3 is 500-550 W.

Further, the stirring in step 1 and step 2 is magnetic stirring.

A method for wood modification by using the foregoing multifunctional wood modifier specifically includes:

method 1: directly spraying the multifunctional wood modifier on the surface of wood, and then standing the wood coated with the multifunctional wood modifier at room temperature for 24-72 h to obtain modified wood; and method 2: adding the multifunctional wood modifier and wood into a reaction tank, keeping a pressure of 0.1-0.5 MPa for 10-30 min, impregnating the multifunctional wood modifier into the wood, and finally standing the immersed multifunctional wood at room temperature for 24-72 h to obtain modified wood.

The principle of the present invention is as follows:

A functional reagent A is the main component of the wood modifier of the present invention, and is mainly made into a film-forming material, which covers the hydrophilic surface of the wood and makes the wood surface hydrophobic (a hydrophobic angle is between 90° and 120°); aliphatic diisocyanate uses the high activity of isocyanate to promote crosslinking of fluorocarbon resin and bonding with the wood substance, thus enabling the film-forming material to have better adhesion and stability; and dibutyltin dilaurate can further reduce surface tension of a petroleum ether solvent, thus promoting rapid volatilization of the solvent. This enables the functional reagent A to better form a film on the wood surface, avoiding the permeation of a large amount of functional reagent A into the wood, improving the characteristics and reducing the cost.

nanoparticles in a functional reagent B also have hydrophobic characteristics after being modified by the surface modifier, polydimethylsiloxane. Combined with the film-forming characteristics of the functional reagent A, the nanoparticles can form the characteristics of hydrophobic surface and micro-nano hierarchical structure on the wood surface. Such structure and component characteristics are similar to the superhydrophobic surface characteristics of lotus leaves, so the superhydrophobic function of the constructed lotus leaves can be bionic.

A functional reagent C mainly uses iodine atoms in molecules to combine with enzyme proteins in microbial cells to destroy its metabolic function, thus killing microorganisms such as mold/fungi/bacteria and realizing the functions of sterilization and mildew prevention. The functional reagent C is soluble in ethanol and the petroleum ether solvents, but insoluble in water, so it can be directly dissolved in the functional reagent A to form a uniform solution, and has certain leaching-resistance function due to insolubility in water. In addition, the alkyl ester component in the functional reagent C can be coupled with a carbon chain of the functional reagent A, thereby enhancing the leaching-resistance property of the functional reagent C. Furthermore, the film forming characteristics provided by the functional reagent A can well shield the leaching of the functional reagent C. The three aspects work together to solve the problem of leaching of the functional reagent C.

The present invention has the following beneficial effects:

The present invention solves the problems of high construction temperature, high toxicity, poor leaching-resistance, complex operation process and single function of the modifiers in the existing methods of wood modification. The method provided by the present invention is simple to operate, cost-effective, environmentally friendly, and suitable for any kind of wood materials.

1. The solvent used in the method of the present invention is D40 solvent (a petroleum ether solvent), and the functional reagent used is fluorocarbon resin with 8 fluorine atoms or less, which is nontoxic and environmentally friendly.

2. The wood is modified by the modifier prepared in the present invention, and the weather resistance is obviously improved. After 90 days of weathering tests in an outdoor environment, the water contact angle of the cross section of the wood can still reach 142°, and the wood surface has no obvious color change, while the untreated wood surface as the control has obvious grooves, cracks and light gray color, indicating that the weather resistance of the modified wood is obviously improved.

3. Due to the selection of the fluorocarbon resin with a low fluorine content, the water resistance of the matrix is reduced. Therefore, the present invention further improves the overall waterproofness of the waterproofing agent through surface modification of nano materials to make up for the lower water resistance of the fluorocarbon resin with a low fluorine content. Experiments prove that the surface of the wood modified by the wood modifier of the present invention has a static water contact angle larger than 150° and a rolling angle less than 10°, and has super-hydrophobic self-cleaning characteristics. The contact angle of hexadecane on the surface of the modified wood is greater than 90°, the rolling angle is less than 20°, and the modified wood has oleophobic property.

4. The antiseptic and bactericidal performances of the wood modified by the multifunctional modifier are improved by 90% or more, the leaching-resistance property is obviously improved, and the anti-leaching rate reaches 90% or more.

5. The construction temperature of the wood modifier of the present invention is 5-40° C. The effective storage time of the wood modifier of the present invention can exceed 2 years at room temperature.

The micro-structure of the modifier of the present invention presents a micro-nano hierarchical structure, and the substrate is covered by a hydrophobic film polymer, which is similar to the micro-structure of lotus leaves. Therefore, the modifier has the comprehensive functions of super waterproofing, oleophobicity, sterilization, mildew prevention and weather resistance, with wide applications indoors and outdoors, and even can be used as a waterproof primer for furniture.

DETAILED DESCRIPTION

Figure 1:
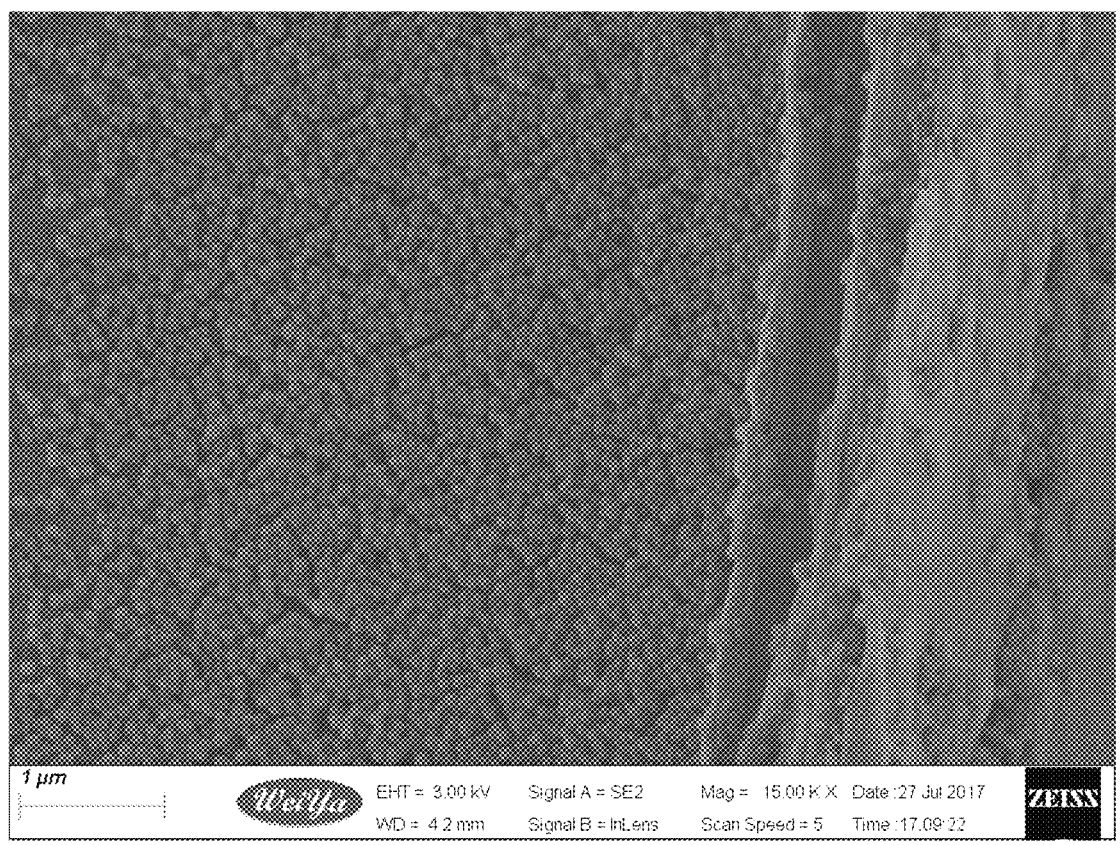
FIG. 1 is a scanning electron microscope image of the surface of modified plywood wood in Embodiment 1.

The technical solution of the present invention is not limited to the specific embodiments listed below, and includes any combinations among the specific embodiments.

Implementation 1: A method for preparing a room temperature cured multifunctional wood modifier according to this implementation includes the following steps:

Step 1: Weighing 1%-50% of hydrophobic polymer resin, 0.1%-1% of additive, 0.1%-10% of curing agent and the balance solvent according to weight percent respectively, mixing and then stirring at room temperature for at least 2 h to obtain a functional reagent A.

Step 2: Weighing 0.1%-5% of nanoparticles, 0.1%-2% of surface modifier and the balance toluene according to weight percent respectively, mixing and then stirring for 72-76 h, cleaning with acetone, centrifuging at 8000-9000 rpm for 3-5 times, and then drying at 78-82° C. for 12-14 h to obtain a functional reagent B.

Step 3: Adding a functional reagent C into the functional reagent A, evenly stirring, adding the functional reagent B, and performing ultrasonic processing for at least 30 min to obtain the multifunctional wood modifier, where the weight of the functional reagent B is 0.1%-1% that of the functional reagent A, and the weight of the functional reagent C is 0.2%-2% that of the functional reagent A.

Implementation 2: This implementation differs from Implementation 1 in that the hydrophobic polymer resin in step 1 is fluorocarbon resin with less than 8 F atoms. Others are the same as those in Implementation 1.

The fluorocarbon resin of this implementation is purchased from Solmont Technology (Wuxi Co., Ltd. and meets the environmental protection standards of Europe, Japan and the United States.

Implementation 3: This implementation differs from Implementation 1 to 2 in that the additive in step 1 is dibutyltin dilaurate. Others are the same as those in Implementation 1 or 2.

The additive of this implementation has the effect of speeding-up drying.

Implementation 4: This implementation differs from one of Implementations 1 to 3 in that the curing agent in step 1 is aliphatic diisocyanate. Others are the same as those in one of Implementations 1 to 3.

Implementation 5: This implementation differs from one of Implementations 1 to 4 in that the solvent in step 1 is D40. Others are the same as those in one of specific Implementations 1 to 4.

The D40 is a petroleum ether solvent.

Implementation 6: This implementation differs from one of Implementations 1 to 5 in that the nanoparticles are one or a mixture of free combination of $SiO_2$, Ag, Cu, CuO, $TiO_2$ and ZnO at any ratio. Others are the same as those in Implementations 1 to 5.

Implementation 7: This implementation differs from Implementation 6 in that the nanoparticles have a particle diameter of 10-500 nm. Others are the same as those in Implementations 6.

Implementation 8: This implementation differs from Implementation 7 in that the surface modifier is polydimethylsiloxane. Others are the same as those in Implementation 7.

Implementation 9: This implementation differs from one of Implementations 1 to 8 in that the functional reagent C in step 3 is IPBC. Others are the same as those in one of Implementations 1 to 8.

Implementation 10: This implementation differs from one of Implementations 1 to 9 in that the ultrasonic power in step 3 is 500-550 W. Others are the same as those in one of Implementations 1 to 9.

Implementation 11: This implementation differs from one of Implementations 1 to 10 in that the stirring in step 1 and step 2 is magnetic stirring. Others are the same as those in one of implementations 1 to 10.

Implementation 12: This implementation differs from Implementation 1 in that the method for wood modification by using the foregoing multifunctional wood modifier specifically includes:

method 1: directly spraying the multifunctional wood modifier on the surface of wood, and then standing the wood coated with the multifunctional wood modifier at room temperature for 24-72 h to obtain modified wood; and method 2: adding the multifunctional wood modifier and wood into a reaction tank, keeping a pressure of 0.1-0.5 MPa for 10-30 min, impregnating the multifunctional wood modifier into the wood, and finally standing the immersed multifunctional wood at room temperature for 24-72 h to obtain modified wood. Others are the same as those in Implementation 1.

Embodiments of the present invention are described in details below. The following embodiments are implemented on the premise of the technical solution of the present invention, and the detailed implementation solutions and specific operation processes are given, but the protection scope of the present invention is not limited to the following embodiments.

Embodiment 1

A method for preparing a room temperature cured multifunctional wood modifier according to this embodiment includes the following steps:

Step 1: Weighing 10% of hydrophobic polymer resin, 0.1% of additive, 1% of curing agent and 88.9% of solvent according to weight percent respectively, mixing and then performing magnetic mixing for 2 h to obtain a functional reagent A.

Step 2: Weighing 0.2% of nano-silica (100 nm), 0.2% of surface modifier and 99.6% of toluene according to weight percent respectively, mixing and then performing magnetic stirring for 72 h, cleaning with acetone, centrifuging at 8000 rpm for 3 times, and drying at 80° C. for 12 h to obtain a hydrophobically modified functional reagent B.

Step 3: Adding a functional reagent C into the functional reagent A, evenly stirring, adding the functional reagent B, and performing ultrasonic processing for at least 30 min to obtain the multifunctional wood modifier, where the weight of the functional reagent B is 0.2% that of the functional reagent A, and the weight of the functional reagent C is 0.2% that of the functional reagent A.

In step 1, the hydrophobic polymer resin is fluorocarbon resin with less than 8 F atoms (purchased from Solmont Technology (Wuxi) Co., Ltd. and meets the environmental protection standards of Europe, Japan and the United States); the additive is dibutyltin dilaurate which has the effect of speeding-up drying; the curing agent is aliphatic diisocyanate, and the solvent is D40 (a petroleum ether solvent).

The surface modifier in step 2 is polydimethylsiloxane.

The functional reagent C in step 3 is IPBC.

A method for wood modification includes:

directly spraying the obtained target multifunctional wood modifier on the surface of plywood with a spraying amount of 50 g/m$^2$, and then air-drying at room temperature for 48 h to obtain super waterproof; oleophobic, bactericidal, mildew-proof and weatherproof multifunctional wood.

Figure 2:
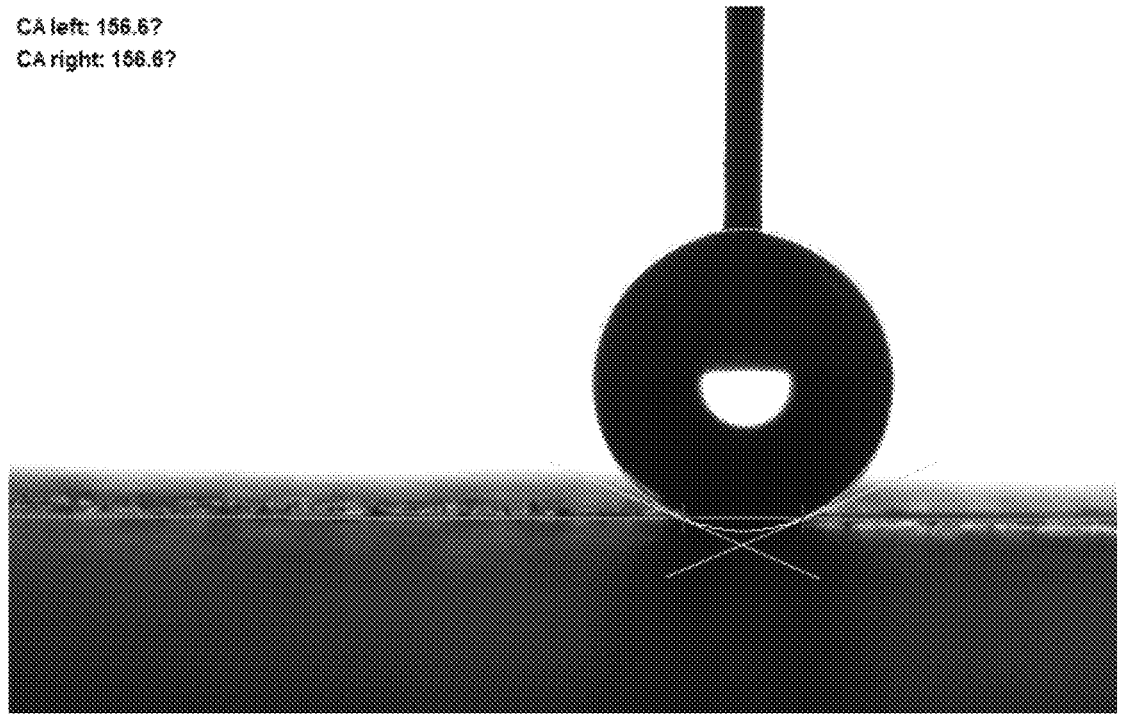
FIG. 2 is a photo of a static water contact angle on the surface of the modified plywood wood in Embodiment 1.
Figure 3:
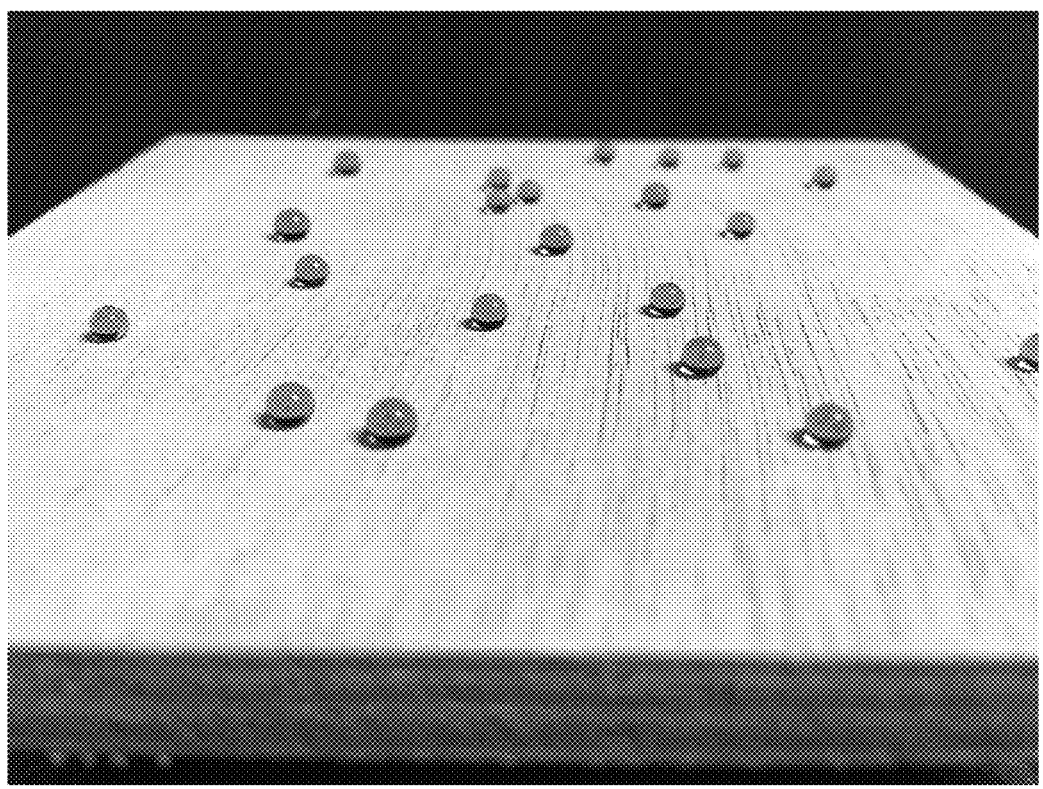
FIG. 3 is a photo of water drops on the surface of the modified plywood wood in Embodiment 1.

The cross section of the modified wood shows obvious micro-nano hierarchical structure, and the cell wall is provided with nanoscale silicon-containing compounds (as shown in FIG. 1). The water contact angle on surface can reach 156.6° (as shown in FIG. 2) and the rolling angle is 10°. Macroscopically, water drops on the surface of plywood form an approximate spherical shape (as shown in FIG. 3). The hexadecane contact angle reaches 91.5°, the rolling angle is 18°, the alcohol contact angle is 77°, and the rolling angle is 29.5°. The wood treated with the foregoing hydrophobic polymer resin only is taken as a control. The water contact angle of the control modified wood is 122°, the rolling angle is less than or equal to 30°, the hexadecane contact angle is 73°, and the rolling angle is 30°; the alcohol contact angle is 65°, and the rolling angle is 30°.

The weight loss rate of the modified wood decayed by brown rot fungi is reduced by 88.4% compared with that of untreated wood, and there is no obvious mildew on the wood surface (*Aspergillus niger*), indicating that the sterilization and mildew resistance of the modified wood have been significantly improved.

Leaching-resistance test: Wood treated with the modifier of this embodiment was compared with wood treated with IPBC only. A wood block was placed on a triangular flask with a funnel, and a spray vehicle was used to simulate rainfall, with rainfall time of 6 h and rainfall set at 10 mm. The triangular flask was used to collect simulated rainfall. The amount of IPBC in the collected artificial rainfall was measured by using a fluorescence meter, and the chemical dosage under scouring was calculated. The sample was compared with the wood sample treated with IPBC only, and the leaching-resistance property was improved by 82.22%.

The wood block treated with the functional reagents and the control test block treated with D40 solution of IPBC were weighed before and after the treatments, and the chemical loading capacity was calculated. Parallel experiments were conducted for 6 times to obtain an average IPBC loading capacity of 016% in treated wood (the weight of IPBC in per gram of wood—the chemical loading capacity was calculated according to the formula of the functional reagent) and an average IPBC loading capacity of 0.12% in control wood (the weight of IPBC in per gram of wood). After scouring experiments, liquid was collected, the usage amount for the treated wood was 485 ml, and the usage amount for the control wood was 498 ml. According to fluorescence measurement, the amount of ODBC contained in the liquid flushed out from the treated wood was about 0.01% on average, and thus the anti-leaching rate was calculated to be 9175% based on the amount of the chemical remaining in the wood. According to fluorescence measurement, it can be seen that the amount of IPBC contained in the liquid flushed out from the control wood was about 0.10% on average, and thus the anti-leaching rate was calculated to be 16.67% based on the amount of the chemical remaining in the wood. Finally, the anti-leaching rate of the treated wood was compared with that of the control wood, and it was calculated that the leaching-resistance property of the treated wood was increased by 82.22%.

Figure 4:
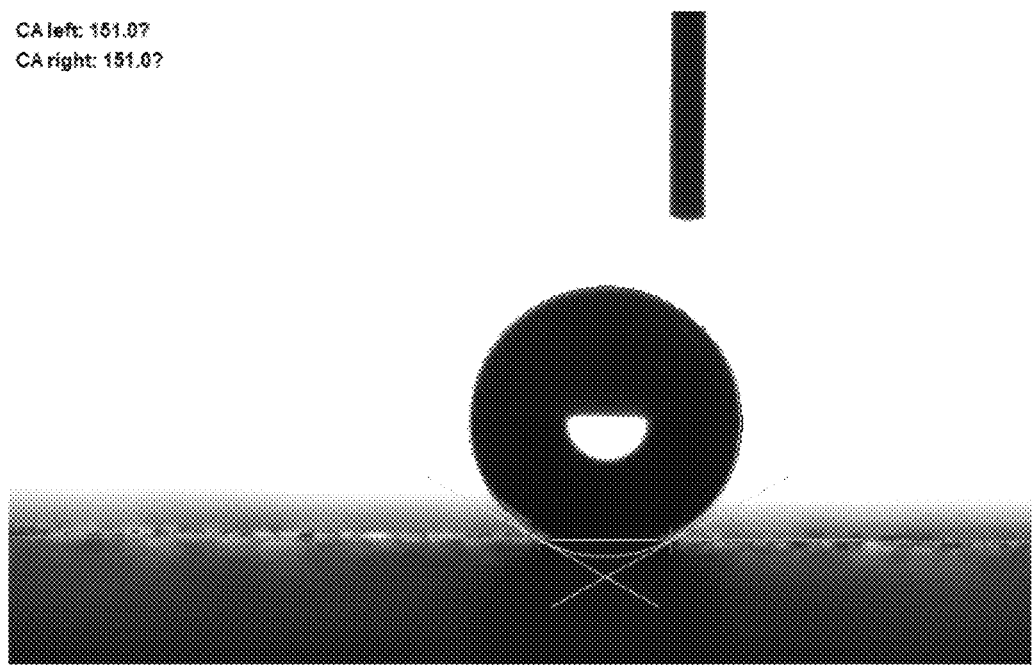
FIG. 4 is a photo of a static water contact angle on the surface of the modified plywood wood after outdoor 90-day weathering tests in Embodiment 1.

After 90 days of weathering tests in an outdoor environment, the treated wood and the control wood were exposed outdoors on the sunny side for the test time from April 1 to July 1, and the surface weathering stability was judged by testing surface contact angles before and after the weathering test. The weather resistance effect was judged by observing wood surface morphology (texture color, surface roughness, etc.). The water contact angle of the cross section of the wood could still reach 151° (as shown in FIG. 4), and the wood surface had no obvious color change, while the untreated wood surface as the control had obvious grooves, cracks and light gray color, indicating that the weather resistance of the modified wood was obviously improved.

Embodiment 2

A method for preparing a room temperature cured multifunctional wood modifier according to this embodiment includes the following steps:

Step 1: Weighing 15% of hydrophobic polymer resin, 0.2% of additive, 1.5% of curing agent and 83.3% of solvent according to weight percent respectively, mixing and then performing magnetic mixing for 2 h or more to obtain a functional reagent A.

Step 2: Weighing 0.1% of nanoparticles, 0.4% of surface modifier and 99.5% of toluene according to weight percent respectively, mixing and then performing magnetic stirring for 72 h, cleaning with acetone, centrifuging at 8000 rpm for 3 times, and drying at 80° C. for 12 h to obtain a hydrophobically modified functional reagent B.

Step 3: Adding a functional reagent C into the functional reagent A, evenly stirring, adding the functional reagent B, and performing ultrasonic processing for at least 30 min to obtain the multifunctional wood modifier, where the weight of the functional reagent B is 0.1% that of the functional reagent A, and the weight of the functional reagent C is 0.3% that of the functional reagent A.

In step 1, the hydrophobic polymer resin is fluorocarbon resin with less than 8 F atoms (purchased from Solmont Technology (Wuxi) Co., Ltd. and meets the environmental protection standards of Europe, Japan and the United States); the additive is dibutyltin dilaurate which has the effect of speeding-up drying; the curing agent is aliphatic diisocyanate, and the solvent is D40 (a petroleum ether solvent).

The nanoparticles in step 2 are a mixture of 100 nm $SiO_2$ and 100 am $TiO_2$ in a weight ratio of 2:1. The surface modifier is polydimethylsiloxane.

The functional reagent C in step 3 is IPBC.

A method for wood modification includes:

Impregnating the multifunctional wood modifier into solid poplar wood by an air pressure of 0.5 MPa, keeping the pressure for 30 min, releasing the pressure and then standing for 72 h at normal temperature and normal pressure to obtain the superhydrophobic, oleophobic, bactericidal, mildewproof and weatherproof multifunctional wood.

Figure 5:
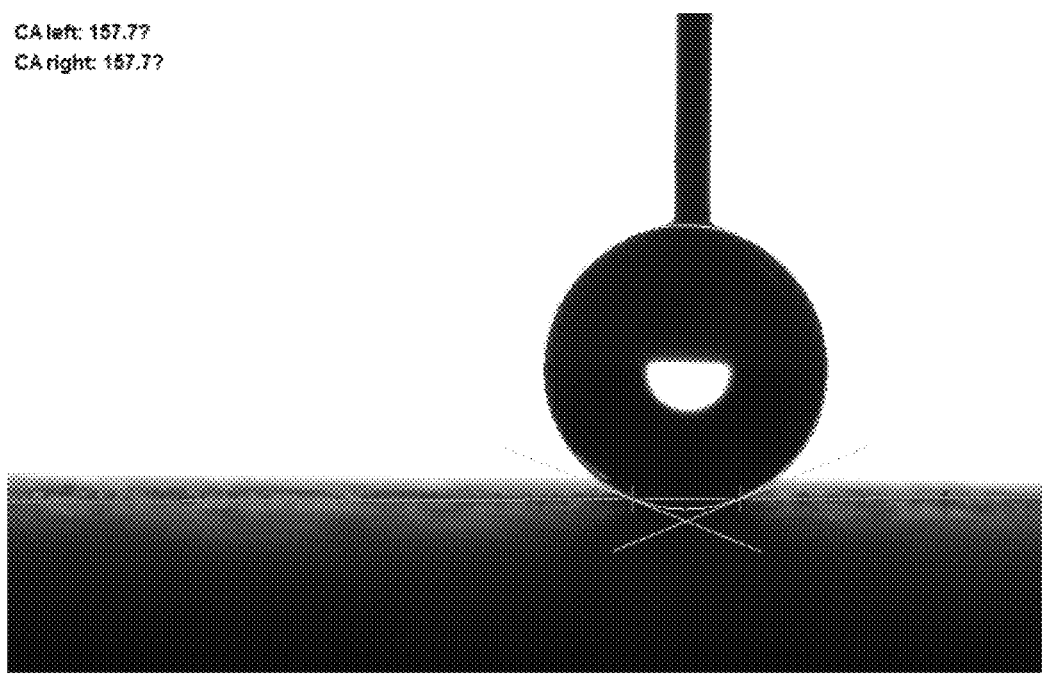
FIG. 5 is a photo of a static water contact angle on the surface of modified poplar wood in Embodiment 2.
Figure 6:
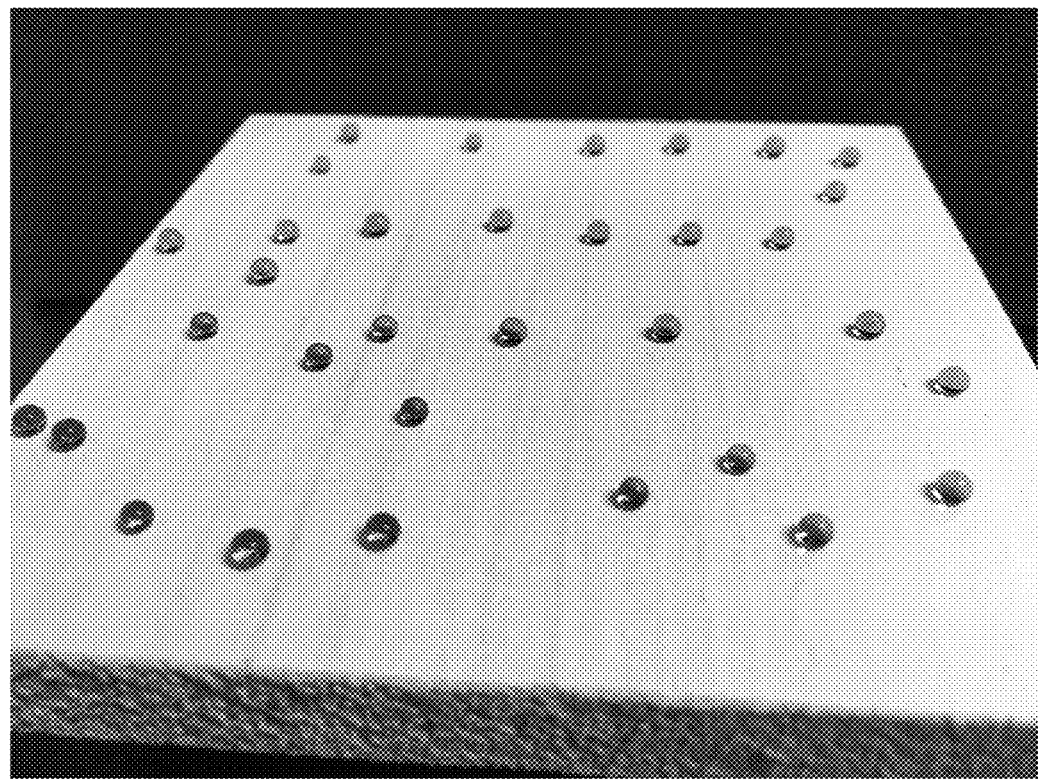
FIG. 6 is a photo of water drops on the surface of the modified poplar wood in Embodiment 2.

The cross section of the modified wood shows obvious micro-nano hierarchical structure, and the cell wall is provided with nanoscale silicon-containing compounds. The water contact angle on surface can reach 157.7° (as shown in FIG. 5) and the rolling angle is 9°. Macroscopically, water drops on the surface of poplar form an approximate spherical shape (in FIG. 6). The hexadecane contact angle reaches 93°, the rolling angle is 17°, the alcohol contact angle is 78°, and the rolling angle is 28°. The wood treated with the foregoing hydrophobic polymer resin only is taken as a control. The water contact angle of the control modified wood is 122°, the rolling angle is less than or equal to 30°, the hexadecane contact angle is 73°, and the rolling angle is 30°; the alcohol contact angle is 65°, and the rolling angle is 30°.

The weight loss rate of the modified wood decayed by brown rot fungi is reduced by 91.3% compared with that of untreated wood, and there is no obvious mildew on the wood surface (*Aspergillus niger*), indicating that the sterilization and mildew resistance of the modified wood have been significantly improved.

Leaching-resistance test: Wood treated with the modifier of this embodiment was compared with wood treated with IPBC only. A wood block was placed on a triangular flask with a funnel, and a spray vehicle was used to simulate rainfall, with rainfall time of 6 h and rainfall set at 10 mm. The triangular flask was used to collect simulated rainfall. The amount of BSF in the collected artificial rainfall was measured by using a fluorescence meter, and the chemical dosage under scouring was calculated. The sample was compared with the wood sample treated with IPBC only, and the leaching-resistance property was improved by 88.33%.

The wood block treated with the functional reagents and the control test block treated with D40 solution of IPBC were weighed before and after the treatments, and the chemical loading capacity was calculated. Parallel experiments were conducted for 6 times to obtain an average IPBC loading capacity of 0.21% in treated wood (the weight of IPBC in per gram of wood—the chemical loading capacity was calculated according to the formula of the functional reagent) and an average IPBC loading capacity of 0.18% in control wood (the weight of IPBC in per gram of wood). After the scouring experiments, liquid was collected, the usage amount for the treated wood was 523 ml, and the usage amount for the control wood was 539 ml. According to fluorescence measurement, the amount of IPBC contained in the liquid flushed out from the treated wood was about 0.01% on average, and thus the anti-leaching rate was calculated to be 95.24% based on the amount of the chemical remaining in the wood. According to fluorescence measurement, it can be seen that the amount of IPBC contained in the liquid flushed out from the control wood was about 0.16% on average, and thus the anti-leaching rate was calculated to be 11.11% based on the amount of the chemical remaining in the wood. Finally, the anti-leaching rate of the treated wood was compared with that of the control wood, and it was calculated that the anti-leaching property of the treated wood was increased by 88.33%.

Figure 7:
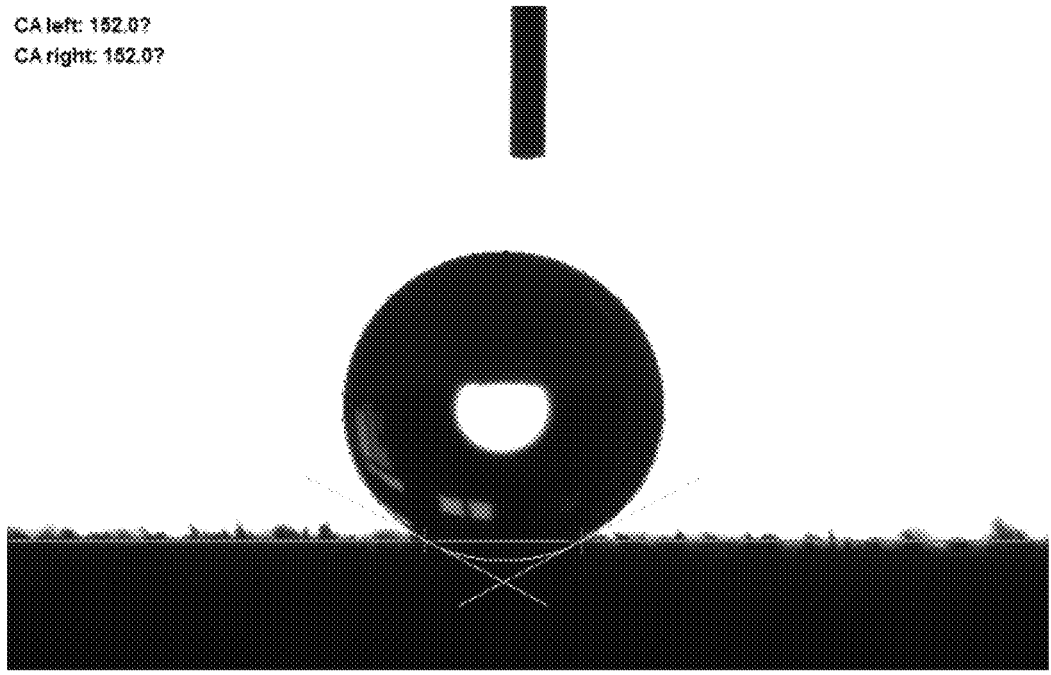
FIG. 7 is a photo of a static water contact angle on the surface of the modified poplar wood after outdoor 90-day weathering tests in Embodiment 2.

After 90 days of weathering tests in an outdoor environment, the treated wood and the control wood were exposed outdoors on the sunny side for the test time from April 1 to July 1, and the surface weathering stability was judged by testing surface contact angles before and after the weathering test. The weather resistance effect was judged by observing wood surface morphology (texture color, surface roughness, etc.). The water contact angle of the cross section of the wood could still reach 152° (as shown in FIG. 7), and the wood surface had no obvious color change, while the untreated wood surface as the control had obvious grooves, cracks and light gray color, indicating that the weather resistance of the modified wood was obviously improved.

What is claimed is:

1. A method for preparing an ambient temperature cured multifunctional wood modifier, comprising the following steps:
   step 1: weighing 1%-50% of hydrophobic polymer resin, 0.1%-1% of additive, 0.1%-10% of curing agent and the balance solvent according to weight percent respectively, mixing and then stirring at an ambient temperature for at least 2 h to obtain a functional reagent A;
   step 2: weighing 0.1%-5% of nanoparticles, 0.1%-2% of surface modifier and the balance toluene according to weight percent respectively, mixing and then stirring for 72-76 h, cleaning with acetone, centrifuging at 8000-9000 rpm for 3-5 times, and drying at 78-82° C. for 12-14 h to obtain a functional reagent B;
   step 3: adding a functional reagent C into the functional reagent A, evenly stirring, adding the functional reagent B, and performing ultrasonic processing for at least 30 min to obtain the multifunctional wood modifier, wherein the weight of the functional reagent B is 0.1%-1% that of the functional reagent A, and the weight of the functional reagent C is 0.2%-2% that of the functional reagent A.

2. The method for preparing an ambient temperature cured multifunctional wood modifier according to claim 1, wherein the hydrophobic polymer resin in step 1 is fluorocarbon resin with less than 8 F atoms.

3. The method for preparing an ambient temperature cured multifunctional wood modifier according to claim 2, wherein the additive in step 1 is dibutyltin dilaurate.

4. The method for preparing an ambient temperature cured multifunctional wood modifier according to claim 3, wherein the curing agent in step 1 is aliphatic diisocyanate.

5. The method for preparing an ambient temperature cured multifunctional wood modifier according to claim 4, wherein the solvent in step 1 is a petroleum ether solvent.

6. The method for preparing an ambient temperature cured multifunctional wood modifier according to claim 5, wherein in step 2, the nanoparticles are one or a mixture of free combination of $SiO_2$, Ag, Cu, CuO, $TiO_2$ and ZnO at any ratio, and the nanoparticles have a particle diameter of 10-500 nm.

7. The method for preparing an ambient temperature cured multifunctional wood modifier according to claim 6, wherein the surface modifier in step 2 is polydimethyl siloxane.

8. The method for preparing an ambient temperature cured multifunctional wood modifier according to claim 6, wherein the functional reagent C in step 3 is iodopropynyl butylcarbamate.

9. The method for preparing an ambient temperature cured multifunctional wood modifier according to claim 6, wherein the ultrasonic power in step 3 is 500-550 W.

10. The method for preparing an ambient temperature cured multifunctional wood modifier according to claim 1, wherein the additive in step 1 is dibutyltin dilaurate.

11. The method for preparing an ambient temperature cured multifunctional wood modifier according to claim 10, wherein the curing agent in step 1 is aliphatic diisocyanate.

12. The method for preparing an ambient temperature cured multifunctional wood modifier according to claim 11, wherein the solvent in step 1 is a petroleum ether solvent.

13. The method for preparing an ambient temperature cured multifunctional wood modifier according to claim 12, wherein in step 2, the nanoparticles are one or a mixture of free combination of $SiO_2$, Ag, Cu, CuO, $TiO_2$ and ZnO at any ratio, and the nanoparticles have a particle diameter of 10-500 nm.

14. The method for preparing an ambient temperature cured multifunctional wood modifier according to claim 13, wherein the surface modifier in step 2 is polydimethylsiloxane.

15. The method for preparing an ambient temperature cured multifunctional wood modifier according to claim 13, wherein the functional reagent C in step 3 is iodopropynyl butylcarbamate.

16. The method for preparing an ambient temperature cured multifunctional wood modifier according to claim 13, wherein the ultrasonic power in step 3 is 500-550 W.

17. A method for wood modification by using the multifunctional wood modifier according to claim 1, wherein the method specifically comprises:
   method 1: directly spraying the multifunctional wood modifier on the surface of wood, and then standing the wood coated with the multifunctional wood modifier at the ambient temperature for 24-72 h to obtain modified wood; and method 2: adding the multifunctional wood modifier and wood into a reaction tank, keeping a pressure of 0.1-0.5 MPa for 10-30 min, impregnating the multifunctional wood modifier into the wood, and finally standing the immersed multifunctional wood at the ambient temperature for 24-72 h to obtain modified wood.

* * * * *